April 2, 1929.  R. C. CHARLTON  1,707,903

CIRCULAR SAW

Filed Dec. 12, 1927

Inventor:-
Richard C. Charlton,
by his Attorneys,
Howson & Howson

UNITED STATES PATENT OFFICE.

RICHARD C. CHARLTON, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

CIRCULAR SAW.

Application filed December 12, 1927. Serial No. 239,518.

The object of my invention is to provide a simple and effective means for retaining insertable saw-teeth in the body of circular saw.

1 is the body of a circular saw having deep gullets 2. Extending into each gullet is a tooth-recess 3 and a wedge-recess 4, separated by a comparatively narrow section 5 of the saw body.

Figure 1:
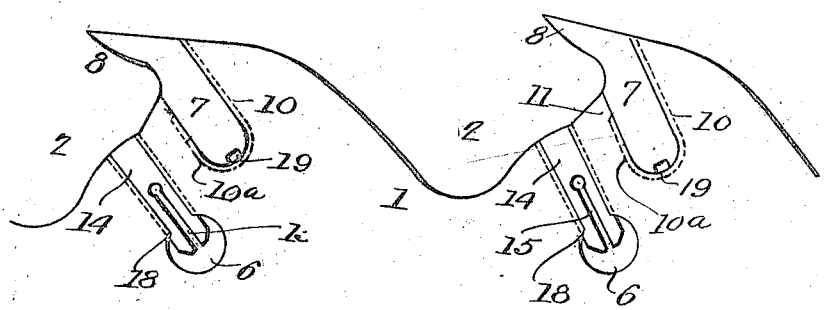
Fig. 1 is a side view of a portion of a circular saw, showing the teeth in position and locked by the wedges.
Figure 2:
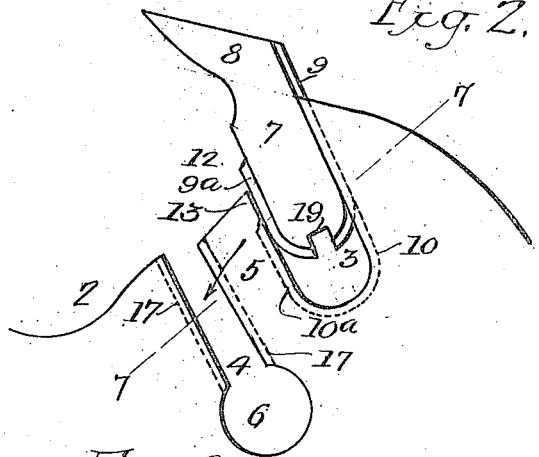
Fig. 2 is a view showing a tooth being forced into a tooth-recess of the body of a circular saw.
Figures 3, 4:
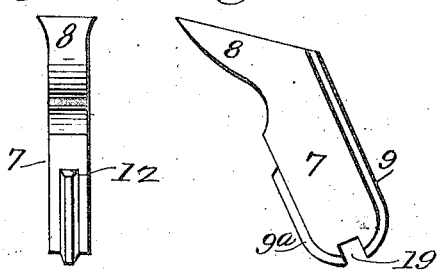
Fig. 3 is an edge view of a tooth.
Fig. 4 is a side view of a tooth.
Figures 5, 6:
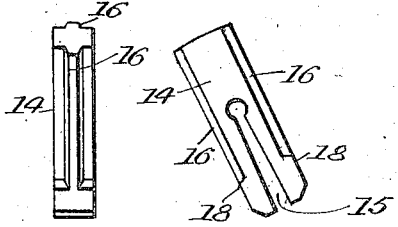
Fig. 5 is an edge view of a wedge.
Fig. 6 is a side view of a wedge.
Figure 7:
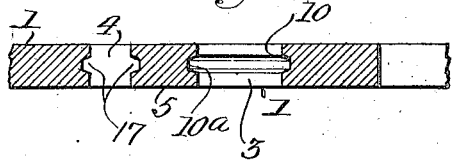
Fig. 7 is a sectional view of the body of the saw on the line 7—7, Fig. 2.

The base of each tooth-recess is preferably rounded, and the inner end of the wedge-recess terminates in a circular enlargement as shown at 6, Fig. 2.

There is sufficient spring of the metal of the blade to allow the teeth 7 to be forced into the recesses 3 as shown in Fig. 2.

Each tooth 7 has a body portion rounded at the inner end to fit the end of the recess 3 and provided with a chisel point 8 at its outer end in the present instance. At the back of the tooth is a rib 9 fitting a groove 10 in the body of the saw. There is also a groove 10$^a$ in the front wall of the recess which is a continuation of the groove 10 in the present instance.

The groove 10$^a$ terminates in an inclined shoulder 11 some distance from the outer end of the recess, and a rib 9$^a$ at the front of the tooth terminates at the point 12 and is shaped to fit the shoulder 11, so that when the tooth is forced into the recess the portion 5 of the body will yield and allow the rib 9$^a$ to pass the portion 13 of the body. When the tooth is in position the portion 5 will spring back, so that the shoulder 11 will extend over the end of the rib 9$^a$ and will retain the tooth in position.

In order to positively lock the teeth to the body of the saw a wedge 14 is provided, which is driven into the recess 4. The inner end of the wedge is split at 15 and has ribs 16 at each side which enter grooves 17 in each wall of the recess 4. When the wedge is driven to its full extent, the shoulders 18 formed on the inner end of the wedge engage the body at the circular enlargement, thus retaining the wedge in position. The wedge forces the portion 5 of the body against the tooth, firmly holding the tooth in position.

By the above-described construction, a comparatively simple and effective means is provided for holding insertable saw-teeth in the body of a saw.

When it is desired to remove a tooth, the inner ends of the wedge are drawn together so that the shoulders 18 clear the body, after which the wedge can be forced out of its recess. This leaves the portion 5 of the body free to yield when force is applied to the tooth.

In the present instance each tooth has a notch 19 at its inner end for a removing tool.

I claim:

The combination in a saw, of a body portion having gullets spaced apart and having a tooth-recess and a wedge-recess spaced apart and extending into each gullet; a groove in both walls of each tooth-recess, the groove in the front wall terminating in a shoulder; a tooth adapted to fit each tooth-recess and having back and front ribs, the front rib stopping at a point to allow the rib to pass beyond the shoulder, the metal of the body portion between the two recesses yielding when the tooth is forced into position; and a wedge arranged to be driven into the wedge-recess.

RICHARD C. CHARLTON